United States Patent [19]

Meneian

[11] Patent Number: 4,565,333
[45] Date of Patent: Jan. 21, 1986

[54] CABLE WINDER SYSTEM

[75] Inventor: Harry Meneian, St. Catharines, Canada

[73] Assignee: Fleet Industries, Fort Erie, Canada

[21] Appl. No.: 629,698

[22] Filed: Jul. 11, 1984

[51] Int. Cl.$^4$ .................... B65H 51/20; B65H 75/00
[52] U.S. Cl. ............................ 242/54 R; 242/47.01; 242/47.12
[58] Field of Search ............... 292/47.01, 47.12, 54 R, 292/55, 86, 86.1, 60

[56] References Cited

U.S. PATENT DOCUMENTS

| | | | |
|---|---|---|---|
| 2,874,918 | 2/1959 | Steiber | 242/82 |
| 3,120,355 | 2/1964 | Bowman | 242/47.12 |
| 3,241,780 | 3/1966 | Kitselman | 242/47.12 |
| 3,822,834 | 7/1974 | Fjarlie | 242/54 R |
| 4,065,066 | 12/1977 | Swett et al. | 242/54 R X |

FOREIGN PATENT DOCUMENTS

| | | | |
|---|---|---|---|
| 856639 | 11/1970 | Canada | 242/54 R |
| 957354 | 11/1974 | Canada | 242/60 |

Primary Examiner—Donald Watkins
Assistant Examiner—Lynn M. Sohacki
Attorney, Agent, or Firm—Louis Weinstein

[57] ABSTRACT

The system is an improvement in an apparatus for transferring cable between a driven rotatable spool and a fixed spool where the rotatable spool is mounted on a stub shaft and the fixed spool is coaxially mounted with respect to the rotatable spool along a common axis. The improved combination comprises an arm which is secured to an axle which, in turn, in the absence of other constraints, would be freely rotatably mounted on the stub shaft. The arm extends in a direction substantially perpendicular to the common axis. A planetary pulley is mounted for rotation at the outer end of the arm, the radial plane of the planetary pulley being substantially parallel to the common axis, the planetary pulley being mounted so as to accommodate cable as it is being transferred between the rotatable spool and the fixed spool. Positive driving structure for the arm is provided which include an element which is secured to one face of the axle, and is adapted to be in driving contact with an actuatable, cooperative member which is operatively associated with the driven rotatable spool. Finally, positive braking structure for the arm are provided which includes an element which is secured to the other face of the axle, and which is adapted to be in driving contact with an actuatable cooperative member which is operatively associated with said fixed spool.

4 Claims, 4 Drawing Figures

CABLE WINDER SYSTEM

BACKGROUND OF THE INVENTION (i) Field of the Invention

This invention relates to a system to provide a means for maintaining electrical continuity between a point at the tow cable termination wrapped on the exterior of the large rotating drum to a fixed termination point external to the drum located on the winch base.

(ii) Description of the Prior Art

Towed sonar cables are highly complex, comprising a multiple core of individually insulated electrical conductors within a strain sheath capable of carrying the intense loads induced by the mass of the towed body plus the hydrodynamic drag of both body and streamed cable.

Whereas the strain sheath can terminate on the winch drum, it is necessary that the small electrical current carried by each of the conductors must terminate at the electronic signal processing centre within the ship. In many sonar systems presently in use, this is achieved by terminating each electrical cord at a slip ring element which is integral with the winch drum and from which a stationary brush picks off the signal current, transmitting the signal by a fixed electrical conductor to the electronic centre.

In view of the small currents and potentials involved, any deterioration in contact resistance between the slip ring and the brush can cause serious loss in sonar performance. Furthermore, since several dozen individual conductors are involved in a single cable, an equal number of individual slip rings and brushes are also required. In consequence, the slip ring mechanism becomes extremely complex, costly and subject to failure on any one or number of elements.

In an attempt to overcome slip ring problems, some oceanographic winches have the electrical pigtail or continuity cable extended through the cheek of the winch drum and wound on a secondary drum and arranged such that as the winch pays out the main cable, the pigtail spills into a pit below the winch and the free end of the pigtail plugs into the electronic system. This has the advantage of eliminating the slip rings. However, the process is somewhat random in which the cable gets tangled in the pit and can result in damage and breakdown.

Canadian Pat. No. 856,639 issued Nov. 24, 1974 to Alfred Kemeny, provided apparatus for storing such a flexible conductor e.g., electrical cables connected at one end to a fixed terminal point, and to a rotating drum disposed in spaced relation with respect thereto for the purpose of reeling in and paying out such cable of limited length in response to a sense of rotation of a reel. That patent also purported to provide the combination of reeling apparatus for paying out and reeling in a tow cable, and a cable storage device for the continuation of the cable intermediate a selected point and the winch drum.

That Kemeny patent proposed to provide apparatus to maintain continuity of a flexible conductor between a movable and static object wherein the conductor intermediate its end is wound onto a winch drum for paying out and reeling in the conductor. The patentee proposed to maintain electrical continuity between a variable depth sonar cable wound on a winch drum and the electronic signal processing equipment carried by the ship, and to circumvent the problems inherent in both slip ring mechanisms and the spilling of the pigtail into a storage pit.

The Kemeny patent purported to meet these objectives by providing a winch assembly including a cable anchored to a drum for reeling in and paying out cable in response to the sense of rotation of the drum and having a continuation of the cable extending from the drum and anchored to a selected location point. Apparatus was provided for storing the cable intermediate such location and the winch drum to prevent slack in the cable during reeling in and paying out of cable on the winch drum. The apparatus included a first storage drum connected to the winch drum for selected interrelated rotation movement of the respective drum. A second storage drum was disposed in selected space relation with the first drum. A winder member engaged to cable at positions in overlapping relation with respect to the respective storage drums and was movable about the periphery thereof for transferring the cable from one drum to the other during rotation of the winch drum.

In order to control slack in the cable, a helical spring was provided to impart a tortional bias force to the winder member. The spring was arranged that when the cable was being transferred in one direction between the rotating drum and the static drum, cable runs over the winder member and forces it to orbit against the spring bias forces of the helical spring. When cable was being transferred in the opposite direction, slack is fed off from the feed drum, to the winder member or forced to rotate in the opposite direction because of the spring forces applied against it so as to take up the slack.

Spring mechanisms of this sort discussed above have, however, proved to be unsatisfactory because they are subject to fatique and loss of spring temper. More importantly, however, it is difficult to maintain a substantially constant torque when there are a relatively large number of turns of the axis end of the torsion spring during a cable transferring operation. Thus, a finite limit is imposed on the cable transfer apparatus by the number of turns which can be accommodated by the spring.

Canadian Pat. No. 957,354 issued Nov. 5, 1979 to R. L. Fjarlie also related to such apparatus for transferring cable from a driven rotatable drum to an undriven static drum. It was directed especially to such apparatus which was adapted for use when the cable was an electric cable having signal voltages impressed thereon, and purported to provide an improvement in overcoming the deficiencies of such spring mechanism.

Fjarlie purported to overcome the problems discussed above by providing a cable transfer apparatus for transferring cable from a rotating drum to a static drum over a cable transfer sheave, wherein means were provided which were frictionally engaged by the one or the other of the rotatable or static drums, depending on which direction the rotatable drum is driven, and which served to maintain cable tension at all times. The transfer sheaves thereby accommodated cable transfer from a rotatable drum to a static drum, the limit of the number of turns to be transferred being determined by the finite storage capacity of the drums. The Fjarlie apparatus utilized frictional coupling means between the static and rotating drums on the one hand and the transfer sheave between them on the other hand, such that the frictional coupling action means together with cable tension served to maintain a driving torque against suitable arm means on which the transfer sheave was mounted.

SUMMARY OF THE INVENTION (i) Aims of the Invention

The present invention has for its main object the provision of an improved such cable winder in which deficiencies of the prior art are minimized. It aims to provide two positively engaged means, one of which is selective to provide a drag on the arm supporting the cable transfer planetary pulley, the other of which is selective to provide a positive drive to the arm supporting the cable transfer planetary pulley so that the electrical continuity of the conductor cable is achieved without the use of slip rings or similar sliding contact, thereby increasing overall system reliability for electronic signal processing.

(ii) Statement of Invention

By this invention, an improvement is provided in an apparatus for transferring cable between a driven rotatable spool and a fixed spool where the rotatable spool is mounted on a stub shaft and the fixed spool is coaxially mounted with respect to the rotatable spool along a common axis, and where the axis of rotation of the rotatable spool is substantially co-extensive with the common axis, the transfer of cable being such that cable is transferred from the fixed spool to the rotatable spool when the rotatable drum is rotated in a first direction of rotation, and from the rotatable spool to the fixed spool when the rotatable spool is rotated in a second direction of rotation, the combination comprising: (a) an arm secured to an axle which, in turn would be freely rotatably mounted on the stub shaft, the arm extending in a direction substantially perpendicular to the common axis for rotation around the axis of rotation of the driven spool axis; (b) a planetary pulley mounted for free rotation at the outer end of the arm, the radial plane of the planetary pulley being substantially parallel to the common axis, the planetary pulley being mounted so as to accommodate cable as it is being transferred between the rotatable spool and the fixed spool; (c) positive driving means for the arm to counteract the freely-rotatably-mounted axle including means secured to one face of the axle, and adapted to be in driving contact with an actuatable cooperative member which is operatively associated with the driven rotatable spool; (d) positive braking means for the arm to counteract the freely rotatably-mounted axle including means secured to the other face of the axle, and adapted to be in driving contact with an actuatable cooperative member which is operatively associated with the fixed spool; whereby (i) rotation of the rotatable spool in the first direction causes the positive driving means to be actuated, and causes the arm to rotate out of the influence of the positive braking means around the arm in the same direction of rotation as the rotatable spool at the same speed of rotation as that of the rotatable spool, and (ii) rotation of the rotatable spool in the second direction causes the positive braking means to apply a braking force to the rotation of the axle, and causes the arm to be rotated out of the influence of the positive driving means, thereby to control cable tension.

(iii) Other Features of the Invention

By a feature thereof, the positive driving means comprises a drive ratchet secured to one face of the axle, a driving pawl plate connected to a driving cone clutch which is operatively connected to the driven rotatable spool, and a driving pawl secured to the driving panel plate in driving relation to the drive ratchet, the driving pawl and drive ratchet assembly being selectively engageable to cause the driving cone clutch to drive the planetary assembly against the torque created by the overhanging conductor cable.

By another feature thereof, the positive braking means comprises a braking ratchet secured to the other face of the axle, a braking pawl plate connected to a braking cone clutch which is operatively connected to the fixed spool, and a braking pawl secured to the braking pawl plate in driving relation to the braking ratchet, the braking pawl and braking ratchet assembly being engageable to cause the braking cone clutch to control cable tension and to pull the planetary pulley assembly around the stub shaft.

By yet another feature thereof, the braking friction between an opposed face of the stationary spool and friction material on the braking cone clutch is controlled by an adjustment locking collar mounting the fixed spool to the fixed spool support for adjustable axial movement along the spool support, the adjustment locking collar being held in place by a friction adjustment nut.

(iv) Generalized Description of the Invention

In broad general terms, the cable winder assembly includes a planetary pulley assembly, which is free to turn on the rotating stub shaft through the use of journal bearings, is driven in a clockwise direction by the driving cone clutch, through the engagement of the driving pawl plate, with the driving ratchet. In the counterclockwise direction, the planetary pulley assembly is driven by the overhanging conductor cable tension, which creates a torque on this assembly. The braking cone clutch counteracts this torque, thereby controlling the conductor cable tension, through the engagement of the braking pawl plate, with the braking ratchet. The rotating spool, whose inside diameter provides the reaction surface for the driving cone clutch is affixed to the rotating stub shaft. The stationary spool, whose inside diameter provides the reaction surface for the braking cone clutch is attached to the fixed frame.

BRIEF DESCRIPTION OF THE DRAWINGS

In the accompanying drawings.

Figure 1:
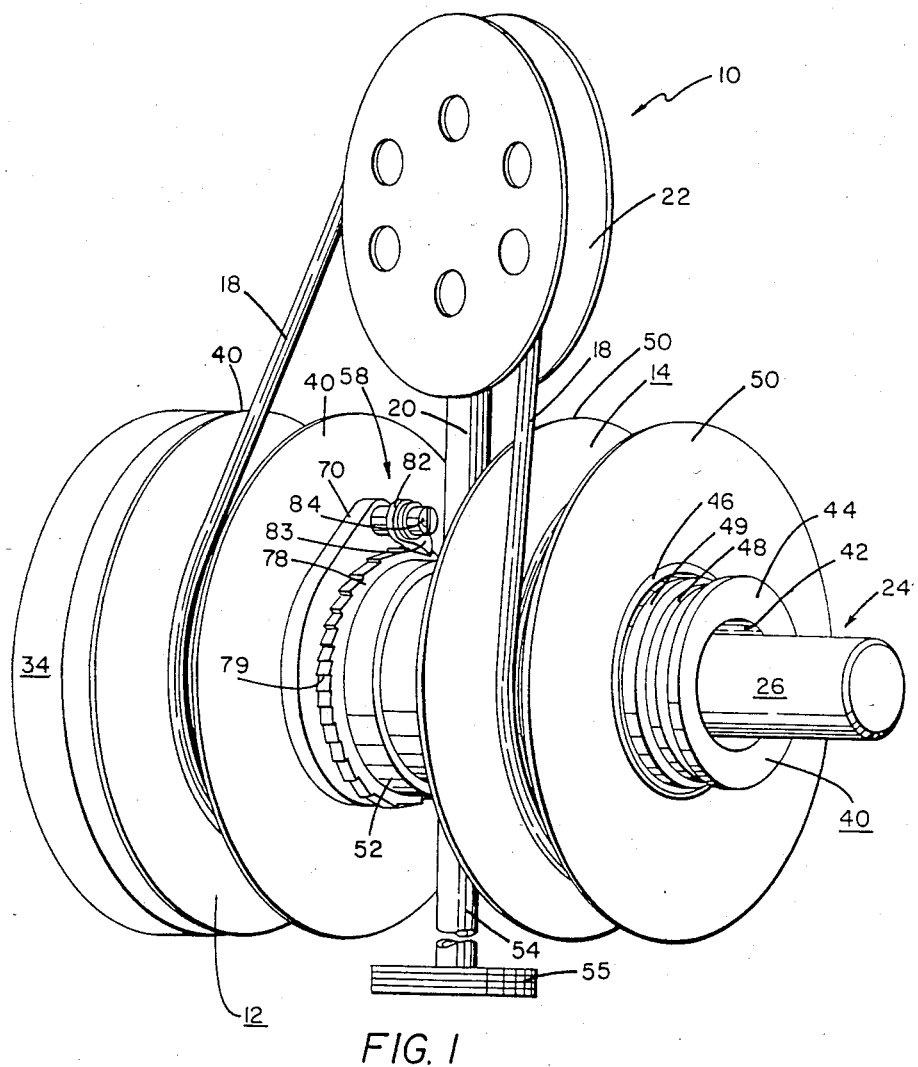
FIG. 1 is a perspective view of the cable winder of an embodiment of this invention.
Figure 2:
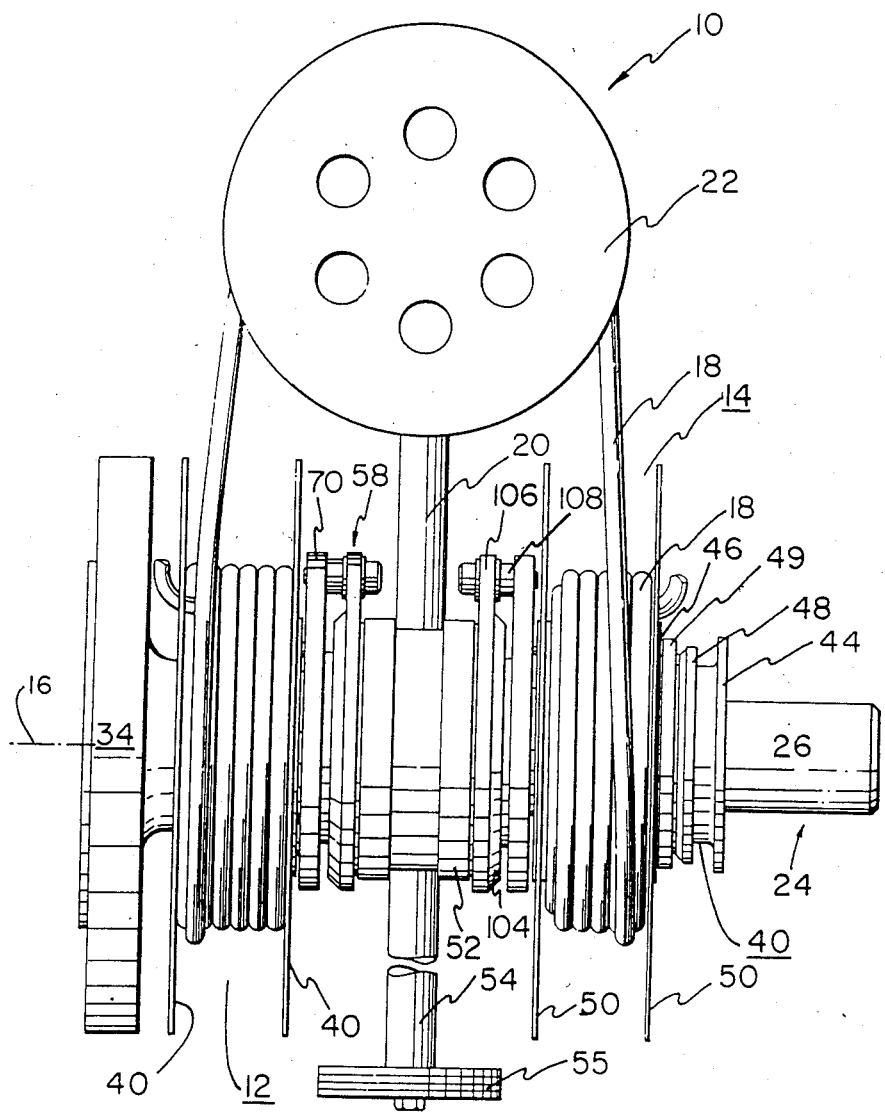
FIG. 2 is a side elevational view of the cable winder of FIG. 1.

DESCRIPTION OF PREFERRED EMBODIMENT (i) Description of FIGS. 1 and 2

The present cable winder apparatus 10, in its broadest form, includes a driven rotatable spool 12 and a fixedly mounted stationary spool 14. The spools 12 and 14 are positioned along a common axis 16. The axis of rotation of the rotatable spool 12 is substantially co-extensive with that common axis. The apparatus 10 is adapted to transfer cable 18 between spools 12 and 14. The apparatus is arranged so that the cable 18 is transferred from the stationary spool 14 to the rotatable spool 12 when the rotatable spool is driven in a counterclockwise direction of rotation. On the other hand, cable 18 is transferred from the rotatable spool 12 to the stationary spool 14 when the rotatable spool 12 is driven in a clockwise direction of rotation. An arm 20 extends in a direction which is substantially perpendicular to the common axis 16 of spools 12 and 14, and planetary pulley 22 is mounted for rotation at the outer end of the arm 20 with the radial plane of the planetary pulley 22 being substantially parallel to the common axis 16 of spools 12 and 14.

Figure 3:
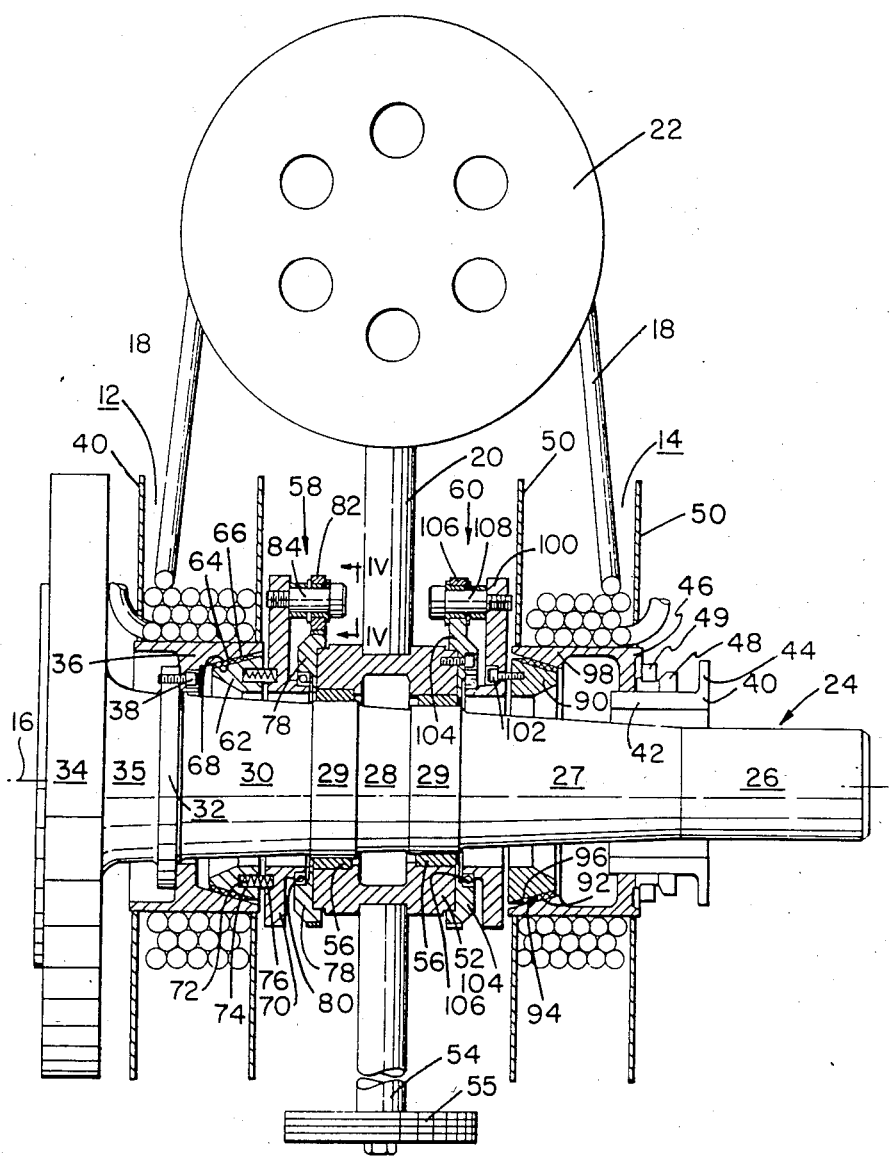
FIG. 3 is a central longitudinal cross-section partly in elevation, through the cable winder of FIG. 1.

(ii) Description of FIG. 3

The driven rotatable spool 12, and the arm 20, are mounted on a shaft 24, as more clearly shown in FIG. 3 of the drawings. The shaft 24 is provided with a cylindrical exposed end 26 merging with a frusto-conical exposed portion 27, a central portion 28 having a pair of spaced apart bearing surfaces 29, an inner frusto-conical portion 30, and a securement collar 32 connected to, and terminating in, a drive sheave 34 by connecting shaft 35. The inner flange 36 of the driven spool 12 is secured to collar 32, e.g., by Allen head bolts 38. The drum 12 is provided with radially-outwardly-extending annular, cable-retaining walls 40.

The fixed spool 14 is secured to hollow cylindrical outer spool support 40 with the cylindrical portion 42 pierced by portions 26, 27 of the shaft 24, and the rim 44 being adapted to be secured, for example, to be a fixed frame. The spool 14 includes a cylindrical portion 46 adjustably secured to cylindrical portion 42 by means of an adjustment locking collar 48 held by friction adjustment nut 49. The spool 14 is likewise provided with radially-outwardly-extending annular cable retaining walls 50.

The axis of rotation of the spool 12 and the arm 20 is substantially co-extensive with the axis of shaft 24.

The planetary pulley 22 is mounted on arm 20 so as to accommodate cable 18 when it is being transferred between the rotatable spool 12 and the stationary spool 14. That is, planetary pulley 22 permits transfer of the cable 18 from spool 12 to spool 14 or vice versa, no matter if either spool is full, empty or partially filled with layers of cable wound or reeled thereon. The planetary pulley 22 is offset with respect to the axis of rotation 16 of arm 20 and spool 12, i.e. the radial plane of fixed drum 14 is perpendicular to the axis of rotation of drum 12 and arm 20, so that when the rotatable spool 12 is driven in the counterclockwise direction (CCW), cable 18 tends to reel from the stationary spool 14 onto the rotatable spool 12. Conversely, when the rotatable spool 12 is driven in the clockwise direction (CW), cable 18 tends to reel from the rotatable drum 12 to stationary spool 14.

The arm 20 is secured to an axle 52 and a diametric extension 54 of the arm 20 extends radially outwardly from the axle 52 and is provided with a counterweight 55. The axle 52 is free to turn with respect to shaft 24 by means of journal bearings 56 running on bearing surfaces 29. The axle 52 is secured by means of a positive driving mechanism 58 to the rotatable spool 12 and is coupled by means of a positive braking mechanism 60 to the stationary spool 14, both of which are described hereinafter.

Driving mechanism 58 includes a driving cone clutch 62 having a frustoconical engaging surface 64 on which is mounted friction material 66. It is adapted to be driven to engage the inner frusto conical face 68 of the flange 36 of the rotatable spool 12. The driving cone clutch 62 is connected to a driving pawl plate 70 by facing springs 72 secured within associated wells 74, 76 in the driving cone clutch 62 and the driving pawl plate 70 respectively. The driving pawl plate 70 is rotatably mounted on a drive ratchet 78 by means of ball bearings 80, the drive ratchet 78 being fixedly secured to the axle 52 as by being shrunk fit thereon. A driving pawl 82 is secured in driving relationship with the tooth 83 thereof engageable with the tooth 79 of drive ratchet 78. Pawl 82 is secured by means of a pin 84 fixed to the face of the driving pawl plate 70.

Braking mechanism 60 includes a braking cone clutch 90 having a frustoconical engaging surface 92 on which is mounted friction material 94. It is adapted to be driven to engage the inner frusto conical face 96 of the flange 98 of the stationary spool 14. The braking cone clutch 90 is securely connected to a braking pawl plate 100, as by means of Allen head screws 102. The braking pawl plate 100 is rotatably mounted with respect to a braking ratchet 104 by means of ball bearings 106, the braking ratchet 104 being fixedly secured to the axle 52, as by being shrunk fit thereof. A braking pawl 106 is secured in driving arrangement with the braking ratchet 104 by means of a pin 108 fixed to the face of the braking pawl plate 104.

OPERATION OF PREFERRED EMBODIMENT

Figure 4:
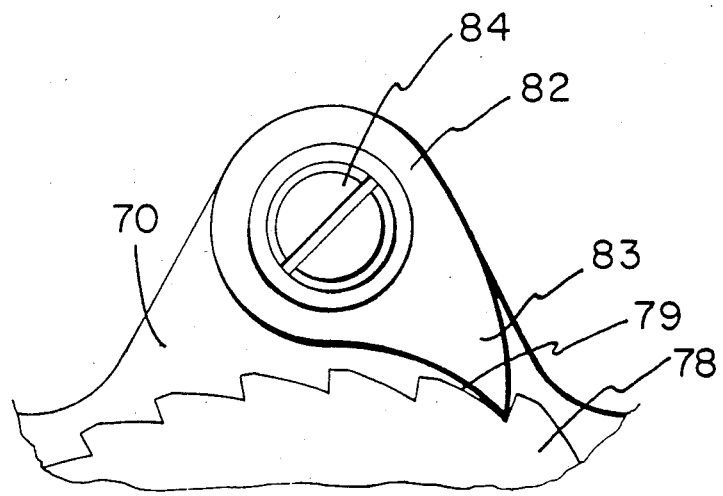
FIG. 4 is a view along the lines IV—IV of FIG. 3.

During counterclockwise rotation of the cable winder mechanism, the tow cable 18 is being reeled in. the rotating spool 12 moves with the drum (not shown) and rotating stub shaft 24 in a counterclockwise rotation. The planetary pulley 22 is pulled around counterclockwise by the overhang of the conductor cable 18, at half the rate of the drum/rotating stub shaft 24. The friction provided by the braking cone clutch 90 through the engagement of the braking pawl 106 on the braking ratchet 104, opposes this motion through friction of the braking cone clutch 90 on the inside diameter of the flange 98 of the stationary spool 14. This controls the cable tension, necessary to pull the planetary pulley assembly 22 around. During this mode of operation, the conductor cable 18 is spooled off the stationary spool 14 onto the rotating spool 12. The driving pawl 82 is in a disabled mode, since the driving pawl plate 70 is moving at twice the speed of the drive ratchet 78, causing this pawl 82 to slip over the slower moving ratchet 78, (i.e. counterclockwise as seen in FIG. 4).

During clockwise rotation, the braking pawl 106 and ratchet 104 assembly is disabled and the driving pawl 82 and ratchet 78 assembly is engaged, causing the driving cone clutch 62 to drive the planetary pulley assembly 20 clockwise against the torque created by the overhanging conductor cable 18. During this cycle, conductor cable 18 is spooled off the rotating spool 12, through the planetary pulley 20 and thence onto the stationary spool 14.

There is sufficient length of cable 18 stored on the spools 12 and/or 14 so that there would be a transfer from spool 12 to spool 14, or vice versa, as all of cable is reeled or unreeled from the winch drum (not shown), whichever may be the case. Thus, so long as there is sufficient storage capacity for cable 18 on spool 12 or spool 14, sufficient cable 18 may be stored completely to accommodate an all-out unreeling of cable 18 or an all-in reeling of cable 18 onto the winch drum. Thus, there is no finite limitation upon the number of revolutions that the winch drum or the rotatable spool 12 which is provided in driven relationship to the winch drum may make without reversal of the direction of drive, at least so far as the installed length of cable 18 is concerned.

ADVANTAGES OVER THE PRIOR ART

Unlike prior devices e.g., in Canadian Pat. No. 856,639 as discussed above, there is no finite limitation because of spring loading or the length of a spring and the number of times which its active end may be wound. Moreover, unlike the prior device, e.g. in Canadian Pat. No. 957,354, as discussed above, there is a positively engaged driving means to spool the cable off the rotatable spool into the stationary spool, and there is a positively engaged brake to control cable tension in the spooling of the cable from the stationary spool to the rotatable spool.

SUMMARY

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalent of the following claims.

What I claim is:

1. In an apparatus for transferring cable between a driven rotatable spool and a fixed spool, where said driven rotatable spool is mounted on a stub shaft and said fixed spool is coaxially mounted with respect to said driven rotatable spool along a common axis, and where the axis of rotation of said driven rotatable spool is substantially co-extensive with said common axis, the transfer of cable being such that cable is transferred from said fixed spool to said driven rotatable spool when said driven rotatable spool is rotated in a first direction of rotation, and from said driven rotatable spool to said fixed spool when said driven rotatable spool is rotated in a second direction of rotation, the combination comprising:
   (a) an arm secured to an axle which, in turn would be freely rotatably mounted on said stub shaft, said arm extending in a direction substantially perpendicular to said common axis for rotation around the axis of rotation of said driven spool axis;
   (b) a planetary pulley mounted for free rotation at the outer end of said arm, the radial plane of said planetary pulley being substantially parallel to said common axis, said planetary pulley being mounted so as to accommodate cable as it is being transferred between said rotatable spool and said fixed spool;
   (c) positive driving means for said arm to counteract said freely rotatably mounted axle including a drive ratchet secured to one face of said axle, and a driving pawl plate connected to a driving cone clutch which is operatively associated with said driven rotatable spool; and
   (d) positive braking means for said arm to counteract said freely rotatably mounted axle including means secured to the other face of said axle, and adapted to be in driving contact with an actuatable cooperative member which is operatively associated with said fixed spool;

whereby,
   (i) rotation of said rotatable spool in said first direction causes said positive driving means to be actuated, and causes said arm to rotate out of the influence of said positive braking means around said arm in the same direction of rotation as said rotatable spool at the same speed of rotation as that of said rotatable spool; and
   (ii) rotation of said rotatable spool in said second direction causes said positive braking means to apply a braking force to the rotation of said axle, and causes said arm to be rotated out of the influence of said positive driving means, thereby to control cable tension.

2. The cable transfer apparatus of claim 1 wherein said positive driving means further comprises a driving pawl secured to said driving pawl plate in driving relation to said drive ratchet, said driving pawl and drive ratchet assembly being selectively engageable to cause said driving cone clutch to drive said planetary pulley assembly against the torque created by the overhanging conductor cable.

3. The cable transfer apparatus of claim 1 wherein said positive braking means comprises a braking ratchet secured to said other face of said axle, a braking pawl plate connected to a braking cone clutch which is operatively connected to said fixed spool, and a braking pawl secured to said braking pawl plate in driving relation to said braking ratchet, said braking pawl and braking ratchet assembly being engageable to cause said braking clutch to control cable tension and to pull said planetary pulley assembly around said stub shaft.

4. The cable transfer apparatus of claim 1 wherein braking friction between an opposed face of said stationary spool and friction material on a braking cone clutch is controlled by an adjustment locking collar mounting said fixed spool to the fixed spool support for adjustable axial movement along said spool support, said adjustment locking collar being held in place by a friction adjustment nut.

* * * * *